Sept. 2, 1958  R. P. McGEE  2,849,824
MECHANICAL CASTING DEVICE
Filed Nov. 5, 1956
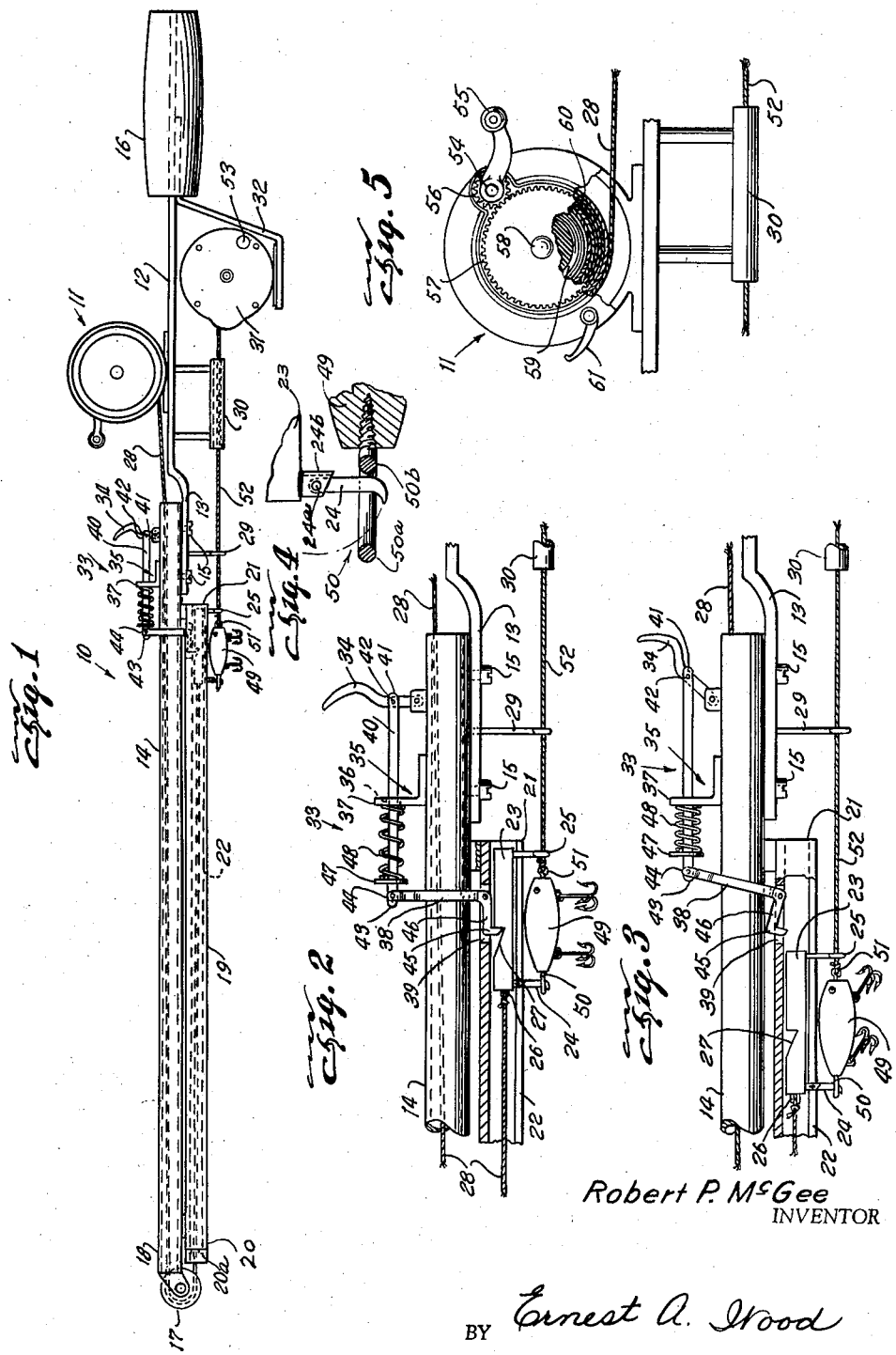
Robert P. McGee
INVENTOR
BY Ernest A. Wood
ATTORNEY

United States Patent Office 2,849,824
Patented Sept. 2, 1958

2,849,824

MECHANICAL CASTING DEVICE

Robert P. McGee, Abernathy, Tex.

Application November 5, 1956, Serial No. 620,268

3 Claims. (Cl. 43—19)

This invention relates to angling, more particularly to mechanical device for casting.

The principal object of the invention is to provide a new and improved mechanical device for casting or projecting a lure and reel line into a stream or other body of water from shore or from a boat.

Another object of the invention is to provide a device which can be easily held while aiming, and releasing the mechanism to project or cast the lure or bait.

And another object of the invention is to include in the device a simple trigger mechanism to release the carriage whose travel and speed projects or casts the lure.

Still another object of the invention is to arrange the device for use with a variety of lures or bait and weights of reel lines.

Other objects will appear in the description given below when considered in connection with the accompanying drawing, wherein:

Fig. 1 is a side elevational view of the invention, set for operation.

Fig. 2 is an enlarged view of a portion of Fig. 1 showing the lure in place and the trigger mechanism set for release of the carriage.

Fig. 3 is similar to Fig. 2, but shows the carriage released, and carrying the lure and line with it.

Fig. 4 is an enlarged view of the front support of the lure.

Fig. 5 shows the principal details of the power mechanism.

Continuing now with a detailed description of the invention, reference numeral 10, Fig. 1, designates the invention generally, which has a conventional reel 11, mounted on bar 12, one end 13, of which is attached to the tube 14, by screws 15. A handle 16, is provided on the opposite end of said bar. Directly below and lying in the same vertical plane, a second tube 19, is mounted on said tube 14, with one end 20, adjacent first tube end 18, and its other end adjacent the end 13, of said bar 12. A grooved pulley 17, is arranged at the tube ends 18, 20, respectively, to lead-off substantially on the center-line of each of said tubes. Said tube 19, has the slot 22, running its full length, opening downwardly substantially in a vertical plane lying in its principal center-line. In the forward end of the tube 19, near said pulley, the cushion-bumper 20a, is mounted, said bumper having an opening through its center. A carriage 23, is arranged to slide freely within said tube 19. A pivoted hook-bar 24, and an eyelet 25, are mounted on its underside, and are arranged to extend through said slot and move freely within it as the carriage is moved in said tube 19.

An eyelet 26, is mounted on one end of said carriage and a one-way notch 27, is provided in its top, approximately midway between its ends. The line 28, leads from said reel 11, through said tube 14, over said pulley 17, and back through tube 19, to said carriage, where it is tied to the said eyelet 26, on said carriage.

An eyelet 29, is mounted on the underside of said bar 12, near its end 13, and extends downwardly to place its eye in alignment with the eye of said eyelet 25. A guide tube 30, is also mounted on the underside of said bar 12, parallel to it near said reel 11, and in alignment with the eye of said eyelet 29. Below said bar 12, a second conventional reel 31, is mounted between said guide tube 30, and said handle 16, on a bracket 32, which is welded to said bar 12, and over which said handle is fitted.

The release mechanism 33, consists of: the trigger 34, pivotally mounted on the top of said tube 14, near said reel 11; a right angle bracket 35, also mounted on top of said tube 14, near said trigger; and opening 36, in the upwardly extending leg 37, of said right angle bracket; an off-set bell-crank lever 8; a slot 39, provided in the top of said tube 19; said bell-crank lever pivotally mounted in said slot; a lever 40, passing through said opening 36, having one end 41, pivotally connected to said trigger at 42, and its other end 43, pivotally connected to end 44, of said bell-crank lever; a hook 45, arranged on end 46, of said bell-crank lever; a collar 47, rigidly mounted on said lever 40; a spring 48, arranged over said lever 40, between said collar and said leg 37, of said right angle bracket; said spring actuating said bell-crank lever to engage said hook of said bell-crank lever in said notch in top of said carriage, when said carriage is positioned in said tube 19, with said notch under said hook.

The lure 49, has eyelet 50, on one end and eyelet 51, on its opposite end. The line 52, wound on said reel 31, passes through said guide tube 30, eyelet 29, eyelet 25, and is tied in eyelet 51, of said lure.

The power mechanism comprises a spring reel 11, having the shaft 54, on which the crank 55 and pinion 56, are mounted. The said pinion 56 meshes with the gear 57, which is mounted on the main shaft 58. The flat clock-type spring 29, has its inner end secured to said main shaft and its outer end secured to the inside surface of the reel-line drum 60. The latch 61, is rotated to engage gear 57, to lock it when desired. With the latch open the line 28, can be reeled or drawn-off at will.

The carriage is moved toward the handle until the notch in its top engages the hook of the release mechanism. Turning the crank 55, counter-clockwise, turns 57, clockwise, which takes up all slack in line 28. Continued turning winds the spring to put the desired tension on said line 28. Now the line 52 is reeled off the reel 31, and laced through the guide tube 30, eyelet 29, and eyelet 25, and tied in eyelet 51, of the lure to be cast. The lure 49 is then mounted on hook 24 of the carriage and the device is ready for use. Moving trigger 34 toward the handle of the device lifts the hook 45, releasing the carriage, which speeds forward, carrying the lure and line 52 with it. Near the end of tube 19, the carriage strikes the cushion bumper 20, which suddenly arrests its motion, the reaction giving it a back-kick, which, together with the momentum of the lure, releases the eyelet 50 from hook-bar 24, permitting said lure to continue its flight outwardly from the end of the device. The hook-bar 24 is pivoted at 24a in the supporting piece 24b, which is arranged to prevent back-swing of the hook-bar. The kick-back occurs, of course, as the lure continues its outward motion. This causes said hook-bar to move away from the front part 50a, of the said eyelet 50, and to strike the rear part 50b, which swings the hook-bar forwardly and upwardly to free it from the eyelet 50. This comprises one cycle of operation. The line and lure are then reeled up on reel 31, whereupon the cycle may be repeated.

The upper tube, while providing protection to the line 28, can, of course, be dispensed with entirely. The slotted tube can be extended and secured to the underside of the flat-bar and the pulley can be mounted on the other end of this tube. The trigger and angle bracket can then be mounted on the top of the flat-bar and connected as already described to the bell-crank lever.

The construction shown and described is, of course, capable of some modification and such modification as may be construed to fall within the scope and meaning of the appended claims is also considered to be within the intent and spirit of the invention.

What is claimed is:

1. In a casting device, two tubes arranged lengthwise, one directly over the other; a longitudinal slot in said lower tube along its bottom from end to end; a handle arranged on one end of said upper tube; spring means arranged on said upper tube; means for energizing said spring means; a carriage slidably mounted in said lower tube; a flexible cable arranged in said tubes for free movement therein, said cable having one of its ends connected to said spring means and the other end to said carriage; cushioning means arranged in the end of said lower tube away from said handle; trigger release holding means to retain said carriage at the end of said lower tube away from said cushioning means, said trigger means being arranged adjacent said handle; a hook-bar mounted on the underside of said carriage near the end to which said cable is connected, said hook-bar extending downwardly through said slot in the bottom of said lower tube; an eyelet mounted on the opposite end of underside of said carriage also extending downwardly through said slot substantially the same distance as said hook-bar; a line-reel mounted on said handle; a line leading off said reel to and through said eyelet mounted on underside of said carriage; a lure arranged to engage said hook-bar and to be tied to said line; whereby said carriage can be released and drawn rapidly by said spring means and cable through said lower tube to collide with said cushioning means to quickly disengage said lure from said hook-bar, permitting said lure to continue its flight and carry said line with it until its momentum is expended.

2. In a casting device, a first tube and a second tube shorter than said first tube; said second tube being slotted throughout its entire length and mounted upon and beneath said first tube with said slot opening directly downward; a flat-bar having one end mounted on one end of said first tube in alignment with it; a handle mounted on the free end of said flat-bar; a pulley arranged on the opposite end of said first tube; a spring loaded line carrying reel mounted on top of said bar between the end of said first tube and one end of said handle; a cushion bumper, having an opening through its center, mounted in said second tube at its end adjacent said pulley; a short slot in the top of said second tube near its opposite end; a carriage having an eyelet mounted in the center of one end; a one way beveled notch cut into the top of said carriage having its bevel portion toward said eyelet end; a hook-bar extending directly downwardly mounted on said carriage near said eyelet end; a second eyelet extending directly downwardly, substantially a like distance, mounted on said carriage at the opposite end; said carriage being slidably mounted in said second tube with said hook-bar and said second eyelet passing outwardly of said tube through said bottom slot; a line leading off said spring loaded reel, passing into and through said first tube, thence around said pulley and into and through said second tube to said carriage, said line there being tied in said eyelet mounted in the end of said carriage; an off-set bell-crank lever pivotally mounted in said top slot in said second tube, said bell-crank lever having a downwardly extending hook arranged on one arm thereof; a spring mounted on said first tube arranged to operate said bell-crank to engage said arm hook in said notch on said carriage when said notch is beneath it; a trigger mounted on said first tube connected to said bell-crank whereby said arm hook can be lifted and disengaged from said notch to release said carriage; a line-carrying reel mounted beneath said flat-bar near said handle; said line leading from said reel to and through said downwardly extending eyelet mounted on said carriage; a lure, arranged for mounting on said hook-bar of said carriage and for the tying on of said lead line; whereby said carriage can be released and drawn rapidly by said spring loaded reel and line through said tube to collide with said bumper to quickly disengage said lure from said hook-bar, permitting said lure with said line attached to it to continue its flight until its momentum is expended.

3. In a casting device, a first tube and a second tube shorter than said first tube; said second tube having a longitudinal slot in its bottom for its entire length and being mounted upon and beneath said first tube with said slot opening directly downward; a flat-bar having one end mounted on the top of said first tube near one end, substantially opposite said longitudinal slot and in alignment with it; a handle mounted on the other end of said flat-bar; a short slot in the top of said second tube opposite said longitudinal slot, near the end of said flat-bar; a cushion bumper having an opening through its center, mounted in the opposite end of said second tube; a grooved pulley arranged on the bumper end of said tubes with its lower lead-off in alignment with said opening in said bumper, and its upper lead-off higher than the top surface of said second tube; a carriage slidably mounted in said second tube, said carriage having an eyelet mounted in one end at its center; a one-way beveled notch in the top of said carriage having its bevel portion toward the bumper end of said second tube; a hook-bar extending directly downwardly mounted on said carriage near said eyelet end; a second eyelet extending directly downwardly, substantially a like distance, also mounted on said carriage near the opposite end; said hook-bar and said second outlet passing outwardly of said second tube through said bottom-slot; a spring loaded line-carrying reel mounted on top of said flat-bar between said handle and end of said first tube; a line leading off said spring loaded reel passing along over the top of said second tube to said pulley, over said pulley and back through said tube to said carriage, there being tied in said eyelet mounted on said carriage end; an off-set bell-crank lever pivotally mounted in said short slot in top of said second tube; said bell-crank lever having a downwardly extending hook arranged on one arm thereof; a trigger mounted on said first tube and connected to said bell-crank lever; a spring mounted over said connection and arranged to operate said bell-crank lever to engage the hook on said arm in said notch on top of said carriage when said notch is beneath it; said trigger connection being arranged whereby said hook can be disengaged from said notch thereby to release said carriage; a line-carrying reel mounted under said flat-bar near said handle; said line leading from said reel to and through said downwardly extending eyelet mounted on said carriage; a lure arranged to engage said hook-bar on said carriage and for the tying on of said line; whereby said carriage can be released and drawn rapidly by said spring loaded reel and line through said tube to collide with said bumper to quickly disengage said lure from said hook-bar, permitting said lure to continue its flight and carry with it said line attached to it until its momentum is expended.

References Cited in the file of this patent

UNITED STATES PATENTS

| | | |
|---|---|---|
| 527,916 | Weibach et al. | Oct. 23, 1894 |
| 1,434,768 | Boggess | Nov. 7, 1922 |
| 1,469,833 | Brakers | Oct. 9, 1923 |
| 2,569,604 | Hall | Oct. 2, 1951 |
| 2,584,678 | Dewey | Feb. 5, 1952 |